United States Patent [19]

Sixsmith et al.

[11] Patent Number: 5,033,756

[45] Date of Patent: Jul. 23, 1991

[54] WIDE TEMPERATURE RANGE SEAL FOR DEMOUNTABLE JOINTS

[75] Inventors: Herbert Sixsmith, Norwich, Vt.; Javier A. Valenzuela, Grantham; William E. Nutt, Enfield, both of N.H.

[73] Assignee: Creare, Inc., Hanover, N.H.

[21] Appl. No.: 610,455

[22] Filed: Nov. 8, 1990

Related U.S. Application Data

[63] Continuation of Ser. No. 243,488, Sep. 12, 1988, abandoned.

[51] Int. Cl.[5] .............................................. F16J 15/06

[52] U.S. Cl. ........................... 277/188 R; 277/188 A; 277/235 R; 277/236; 285/904; 285/917

[58] Field of Search ............... 277/188 A, 235 R, 236; 285/904, 917, 363, 368, 422, 423; 272/188 R

[56] References Cited

U.S. PATENT DOCUMENTS

| | | | |
|---|---|---|---|
| 857,134 | 1/1907 | Wilcox | 277/235 B X |
| 1,782,014 | 11/1930 | Rimmelspacher | 277/231 |
| 1,846,401 | 2/1932 | Oven | 277/235 B |
| 2,205,010 | 6/1940 | Raybould | 277/233 X |
| 2,249,127 | 7/1941 | Goetze | 277/234 X |
| 2,327,837 | 5/1943 | Williams | 277/231 |
| 3,167,324 | 1/1965 | Kratochvil | 277/235 B |
| 3,951,418 | 4/1976 | Dryer | 285/904 X |
| 4,383,694 | 5/1983 | Fontana | 277/231 |
| 4,418,918 | 12/1983 | Nicoll | 285/917 |
| 4,549,741 | 10/1985 | Usher et al. | 277/236 |

FOREIGN PATENT DOCUMENTS

| | | | |
|---|---|---|---|
| 63682 | 8/1892 | Fed. Rep. of Germany | 277/227 |
| 149719 | 3/1904 | Fed. Rep. of Germany | 277/231 |
| 688252 | 2/1940 | Fed. Rep. of Germany | 277/231 |
| 720039 | 4/1942 | Fed. Rep. of Germany | 277/184 |
| 799313 | 3/1936 | France | 277/235 R |
| 2261462 | 9/1975 | France | 277/236 |

OTHER PUBLICATIONS

Journal of Vacuum Science Technology (vol. 7, No. 3): "Indium Caulking Technique for Vacuum Seal", Judson F. Bouman, May–Jun. 1970, p. 462 (vol. 3).

Brochure: Flexible Graphite, The High Temperature Performer by: U.S. Graphite, Inc. 7 pages, date unknown.

*Primary Examiner*—Thomas B. Will
*Assistant Examiner*—Scott Cummings
*Attorney, Agent, or Firm*—Wood, Herron & Evans

[57] ABSTRACT

The present invention is directed to a seal for demountable joints operating over a wide temperature range down to liquid helium temperatures. The seal has anti-extrusion guards which prevent extrusion of the soft ductile sealant material, which may be indium or an alloy thereof.

8 Claims, 1 Drawing Sheet

WIDE TEMPERATURE RANGE SEAL FOR DEMOUNTABLE JOINTS

This invention was made with Government support under Contract No. DE-AC01-86ER80336 awarded by the Department of Energy. The Government has certain rights in this invention.

This application is a continuation of application Ser. No. 243,488, filed Sept. 12, 1988, now abandoned.

BACKGROUND OF THE INVENTION

This invention relates to an all metal seal for demountable joints with flanges which provides leak tight sealing over a range of temperatures from liquid helium temperatures upwards to temperatures approaching the melting point of the sealing agent.

The four basic types of seals used in demountable joints are O-rings, C-rings, gaskets and compression fittings. These seals are used in a wide variety of applications including rubber gaskets for "Mason" jars and "Viton" O-rings for the solid fuel rocket boosters of the space shuttle. While useful for many applications, the known seals are generally inadequate for sealing fluid systems at cryogenic temperatures or at temperatures above the working range of elastomer materials.

Cryogenic fluid systems are used extensively in high energy physics research and, generally, helium is used as the working fluid. Due to the small atomic size of helium, however, it is an extremely difficult fluid to seal. To provide adequate thermal insulation, cryogenic systems are often vacuum insulated; and very small leaks, which in an ambient pressure environment are of no consequence, can spoil the vacuum. Because the known seals for demountable joints are not totally effective in sealing cryogenic working fluids such as helium, the piping joints in cryogenic systems are oftentimes welded or soldered. Soldered joints and welded joints in cryogenic systems have several drawbacks, however. Welding may damage heat sensitive components such as diode temperature sensors and soldering may introduce contaminants into the system which tend to freeze-out in small flow passages and cause blockage thereof. In addition, welded or soldered joints effectively eliminate the possibility of easily removing system components for maintenance or testing.

For the reasons stated, it is desirable to use demountable joints in cryogenic systems. To this end, it has been recognized that soft ductile metals are the best sealant materials for demountable joints for cryogenic service below liquid nitrogen temperatures. Indium metal is used as the sealing agent in many of the known demountable joint designs. Indium is advantageous in that it remains soft and ductile at cryogenic temperatures and flows easily into irregularities in the surfaces being sealed, thereby forming a vacuum-tight seal. Indium, however, is disadvantageous in that because it is soft and ductile it is easily extruded from between the surfaces being sealed, thus allowing them to leak. This extrusion may occur during thermal cycling when the seals are successively cooled and heated between cryogenic and room temperature, or it may be caused by joint vibration.

Various techniques have been proposed to mitigate the problem of sealant extrusion. Among these are O-ring grooves and precoating the mating surfaces with the gasket material. The proposed techniques have only met with limited success, however, and therefore, the need still exists for a reliable, demountable, cryogenic seal which can withstand repeated cycling from room temperature to cryogenic temperatures as well as significant bending forces without leaking.

U.S. Pat. Nos. 1782,014, 2,249,127, 2,327,837, and 4,418,928 have been located; however, no representation is made that they are relevant prior art or that they are the only prior art to this invention. Rimmelspacher, U.S. Pat. No. 1,782,014, discloses a packing gasket which has for its primary purpose providing an improved gasket construction for sealing joints in pumps. The disclosure indicates that the gasket portion of the body is made of cork and is enclosed in a sheet metal casing. As will be appreciated, cork would not work effectively as the sealant material in a cryogenic fluid system. In Goetze, U.S. Pat. No. 2,249,127, there is disclosed a composite gasket consisting of a pair of packing elements disposed within a sheet metal casing or shell. The disclosed packing elements are made of asbestos or an asbestos compound, and therefore would not work effectively as the sealant material in a cryogenic fluid system. Williams, U.S. Pat. No. 2,327,837, discloses an S-shaped retainer configuration for a seal-gasket, however, it discloses using a packing material of cement and asbestos. Again, it will be appreciated that because of its porous nature such a packing material is wholly unsuited for use in cryogenic fluid systems. Fontana, U.S. Pat. No. 4,383,694, discloses a gasket device for statically sealing high pressure and temperature fluids. The gasket device of Fontana comprises an S-shaped metal liner which defines two cavities that contain inserts of an elastic sealant material. Several materials are disclosed for use as the sealing inserts in Fontana; for example, rubber, vegetal fibers, Teflon, reinforced rubber, asbestos filaments, compressed graphite-asbestos, and other non-metallic materials. None of the disclosed sealant materials would appear to be effective as a long term sealant in a cryogenic fluid system wherein helium is the cryogenic fluid. Finally, Nicoll, U.S. Pat. No. 4,418,918, discloses using an indium alloy as the sealant material in a threaded cryogenic seal having opposed annular recesses.

SUMMARY OF THE INVENTION

The present invention is directed to a wide temperature range seal which utilizes the excellent sealing characteristics of soft ductile metals such as indium or alloys thereof while completely eliminating the problem of sealant extrusion. The seal of this invention comprises a metallic anti-extrusion guard that has two circumferential metal bands of generally U-shaped cross-section and a deformable sealant material, preferably indium or an alloy thereof, or graphite disposed between the metal bands. As used herein, the term "circumferential" means that the metal bands define a perimeter or boundary, but not limited to a circular shape. Thus, the circumferential metal bands may be circular, square, rectangular, hexagonal, elliptical or any other suitable shape.

The metal bands of the anti-extrusion guard have U-shaped cross-sections arranged so that the open end of the inner band faces generally radially outward and the open end of the outer band faces generally radially inward to thereby capture the sealant material disposed therebetween. The anti-extrusion guard is adapted to be clamped between opposed flanges of a demountable joint with opposite surfaces of each U-shaped band frictionally abutting opposed flanges when clamped therebetween.

The anti-extrusion guard operates by means of hydraulic pressure. That is, when the guard and sealant are clamped between opposing flanges, the clamping pressure forces the sealant, which fills the space between the bands, to completely conform to irregularities in the flange surfaces and thereby effect a leak-free joint. In addition, the clamping pressure forces the sealant to exert outward pressure on the U-shaped metal bands in a direction normal to the surfaces of the bands which abut the flanges thereby increasing the frictional engagement between the band surfaces and the adjacent flanges. In this regard, it has been advantageously determined that displacement of the inner and outer bands relative to the flanges and extrusion of the sealant is prevented when the following condition is met:

$$W > \frac{t}{2f}$$

where W is the width of each of the band surfaces that abuts a flange, t is the thickness of the seal and f is the coefficient of friction between the band surfaces and the flanges.

The preceding equation can be derived from the following argument. The maximum force per unit length the U-shaped metal bands can be subjected to, which will not result in radial slippage of the U-shaped metal bands, is equal to the clamping pressure (P) multiplied by twice the width of the U-shaped metal bands abutting the flanges (2W) multiplied by the coefficient of friction (f) between the U-shaped metal bands and the flanges. This maximum retaining force must be greater than the force tending to displace the U-shaped metal bands. The force per unit length tending to displace the U-shaped metal bands is equal to the clamping pressure (P) multiplied by the thickness of the seal (t). Therefore, radial displacement of the U-shaped metal bands will not occur when the following inequality is met: $P2Wf > Pt$. From this inequality, the design requirement for W is obtained.

BRIEF DESCRIPTION OF THE DRAWINGS

The foregoing and other features and advantages of the invention will be apparent from the following more detailed description of the preferred embodiment of the invention as illustrated in the accompanying drawings in which.

DETAILED DESCRIPTION OF THE INVENTION

Figure 1:
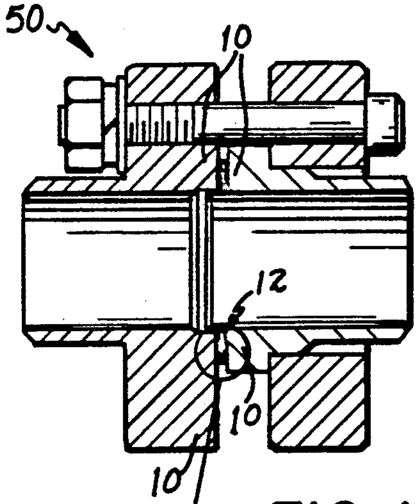
FIG. 1 is a cross-section of a demountable joint with flanges and a cryogenic seal in place.
Figure 2:
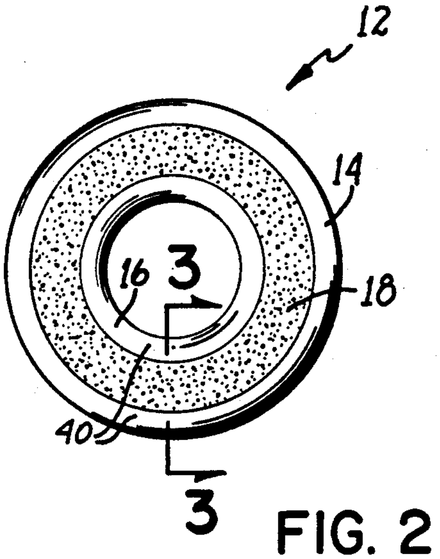
FIG. 2 is a top or plan view of the cryogenic seal.
Figures 3, 4, 5, 6:
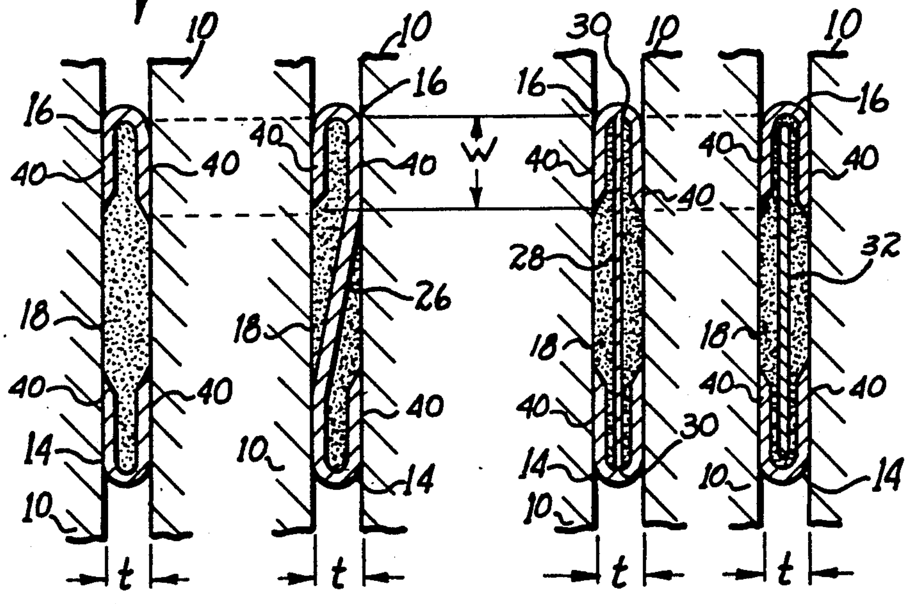
FIG. 3 is a sectional view through 3—3 of FIG. 2 showing a U-seal embodiment of the anti-extrusion guard.
FIG. 4 is a sectional view similar to FIG. 3, but showing a different S-seal embodiment of the anti-extrusion guard.
FIG. 5 is a sectional view similar to FIG. 3, but showing a different anchor-seal embodiment of the anti-extrusion guard.
FIG. 6 is a sectional view similar to FIG. 3, but showing an annular reinforcing ring to provide additional strength against deformation during handling.

Referring to FIG. 1, the seal 12 of the present invention is particularly adapted to be used in demountable joints shown generally at 50 having flanges 10. In a preferred form, as shown in FIGS. 2 and 3, the seal 12 comprises an anti-extrusion guard having a continuous circumferential outer metal band 14 of generally U-shaped cross-section and a continuous circumferential inner metal band 16 of generally U-shaped cross-section and a deformable sealant material 18 disposed between the inner 16 and outer 14 metal bands of the anti-extrusion guard. The preferred sealant material is indium or an alloy thereof, as graphite and the anti-extrusion guard is preferably made of a high yield strength metal which retains its ductility down to liquid helium temperatures and which is compatible with the sealant material. Candidate metals are, for example, nickel, stainless steel, aluminum and brass. FIGS. 4–6 show alternative embodiments of the anti-extrusion guard of the seal in cross-sections similar to FIG. 3. In FIG. 4, metallic web 26 traverses sealant material 18 and joins diagonally opposed edges of the inner 16 and outer 14 U-shaped metal bands. In FIG. 5, metallic web 28 adjoins the inner 16 and outer 14 U-shaped metal bands at their bases 30. In FIG. 6, metallic reinforcing plate 32 is encapsulated within sealant material 18 and is disposed between the inner 16 and outer 14 metal bands.

As will be appreciated from viewing FIGS. 3–6, each U-shaped metal band has opposite surfaces 40 frictionally abutting the opposed flanges 10 when clamped therebetween. As clamping pressure is increased, as by tightening flange bolts 50, one of which is shown in FIG. 1, the soft ductile sealant material conforms to the flange surfaces to effect a leak-free joint. Concurrently, sealant 18 exerts pressure on the U-shaped metal bands 14 and 16, one component of which is normal to the surfaces 40. This hydraulic pressure keeps surfaces 40 of the U-shaped metal bands 14 and 16 in frictional engagement with the adjacent flanges. Extrusion of sealant 18 between surfaces 40 and the adjacent flanges and displacement of the inner and outer bands relative to the flanges is prevented when the following condition is met:

$$W > \frac{t}{2f}$$

where W, indicated in FIGS. 3–6, is the width of surfaces 40 that abut the flanges, t is the thickness of the seal and f is the coefficient of friction between surfaces 40 and the adjacent flanges.

It will be obvious to those skilled in the art that various other seal configurations, e.g., square, hexagonal, elliptical, etc., and various other anti-extrusion guard configurations may be used to carry out the objects of this invention. In addition, the invention is not to be limited to the choice of material used as the sealant or for the anti-extrusion guard.

What is claimed is:

1. A seal for joints in a cryogenic fluid system, said joints having opposed surfaces, comprising:

an anti-extrusion guard having a continuous circumferential outer band of generally U-shaped cross-section and a continuous circumferential inner band of generally U-shaped cross-section, said guard having a thickness t;

a soft ductile sealant material for forming a seal with the opposed joint surfaces when clamped therebetween, said sealant material disposed between said inner and outer U-shaped bands of said guard and impermeable to fluid;

said inner and outer U-shaped bands having oppositely facing inner open ends and opposite surfaces of width W for engaging the opposed joint surfaces when clamped therebetween, said width being the width of the sides of said U-shaped bands in contact with the flanges, said thickness t and width W of said U-shaped bands related as follows:

$$W > \frac{t}{2f}$$

wherein f is the coefficient of friction between said opposite surfaces of said seal and the opposed joint surfaces, whereby radial expansion and contraction of said seal and extrusion of said sealant are substantially prevented by frictional engagement between said opposite surfaces of said seal and the opposed joint surfaces when said seal is clamped between the opposed joint surfaces in the cryogenic fluid system.

2. The seal of claim 1 further comprising a web traversing said sealant material and joining said oppositely-facing U-shaped bands.

3. The seal of claim 2 wherein said web joins each of said U-shaped bands at a base thereof.

4. The seal of claim 2 wherein said web joins diagonally opposed edges of said bands.

5. The seal of claim 1 further comprising a reinforcing plate encapsulated within said sealant material.

6. The seal of claim 1 wherein said soft ductile sealant material is indium or an alloy thereof.

7. The seal of claim 1 wherein said soft ductile sealant material is graphite.

8. The seal of claim 1 wherein said anti-extrusion guard is metallic.

* * * * *